Feb. 18, 1964   M. H. GROVE   3,121,553
VALVE CONSTRUCTION

Filed Sept. 7, 1962   2 Sheets-Sheet 1

INVENTOR.
MARVIN H. GROVE
BY
*Flehr and Swain*
ATTORNEYS

INVENTOR.
MARVIN H. GROVE
BY
ATTORNEYS

3,121,553
VALVE CONSTRUCTION
Marvin H. Grove, 340 Hillside Ave., Piedmont, Calif.
Filed Sept. 7, 1962, Ser. No. 221,997
8 Claims. (Cl. 251—172)

This invention relates generally to valves such as are employed for controlling fluid flow, and to sealing means for use in such valves.

In the construction of fluid flow control valves, it has been common to employ seals formed of resilient materials such as synthetic rubber, Teflon or nylon. Simple insert rings mounted on either the body or the valve members are effective in some instances, but in general do not provide the desired degree of accommodation for valves made in the larger sizes, or where the cooperating working surfaces may not be true. Simple insert seals are mounted in a permanent fashion, as by pressing on molding into a retaining recess. Some resilient seal rings, particularly in the form of O-rings, have been loosely retained, but the mounting means employed (e.g. spring pressed seat rings) have been such as to add considerable to cost of manufacture. For many services it is desirable to employ durable materials like nylon, which generally are considerably harder than materials like synthetic rubber. In the past sealing members made of nylon or like hard materials have had limited application in valves of the larger sizes, because their range of accommodation has been quite limited, and because the mounting means employed with such sealing members has been subject to certain disadvantages.

In general it is an object of the present invention to provide a novel valve construction having improved sealing means utilizing members formed of resilient material.

Another object of the invention is to provide a valve of the above character having sealing means formed of relatively hard resilient material, like nylon, which is characterized by adequate accommodation to compensate for mechanical inaccuracies.

Additional objects and features of the invention will appear from the following description in which the preferred embodiments have been set forth in detail in conjunction with the accompanying drawing.

Referring to the drawing.

Figure 1:
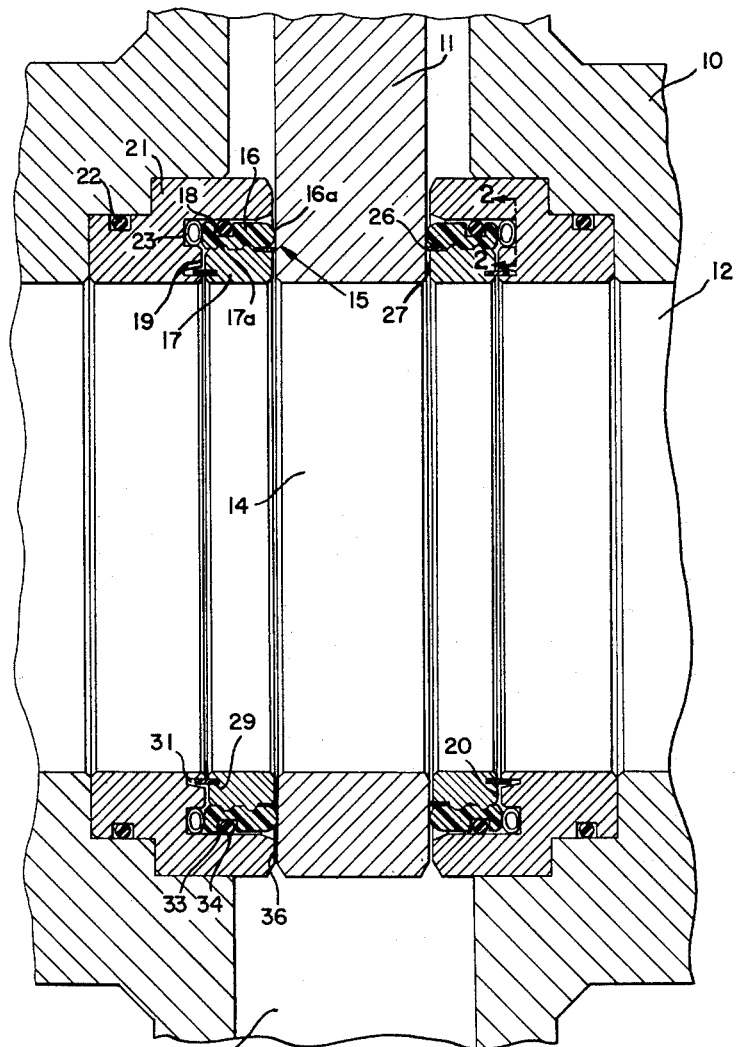
FIGURE 1 is a side elevational view in section, illustrating a valve incorporating the present invention.

The valve illustrated in FIGURE 1 is of the gate type, consisting of a body part 10, together with the gate part 11. The body is provided with aligned openings 12 forming flow passages for connection with associated piping. The gate 11 is disposed in the closed body cavity 13, and is connected to suitable operating means such as a handwheel etc. In this instance the valve is of the through port type, and the gate is provided with a port 14 adapted to register with the openings 12 for full open position of the valve.

The sealing means shown in the valve of FIGURE 1 is carried by the body part, and are adapted to establish sealing engagement with both sides of the gate. In general each means consists of a sealing assembly 15. The resilient portion 16 of each assembly 15 is in the form of a ring formed of resilient material, like nylon. It may be formed of a single piece of nylon molded to suitable form, or from two or more smaller pieces which are bonded together as by suitable cement. The ring 16 is secured to a carrier ring 17, which in this instance is formed of metal. The outer periphery of the carrier ring 17 is shown provided with ridges 17a, which interlock into complementary grooves formed on the inner periphery of the ring 16. In addition to this interlock the parts can be bonded together by use of suitable cement. The axial length of the carrier ring 17 in this instance is slightly less than the corresponding length of the ring 16. The end 16a of the ring 16 preferably is rounded as illustrated, and makes sealing contact with the adjacent side surface of the gate 11.

The parts described above are accommodated within the recess 20 defined by the peripheral surface 18, which conforms to the surface of a cylinder, and the bottom recess surface 19. As will be presently explained this recess may be within a portion of the body, although in this instance the recess is formed in the mounting ring 21. The body is recessed to accommodate the mounting ring 21, and a seal is provided between the mounting ring and the body, as by means of the resilient seal ring 22 of the O-ring type.

Figure 2:
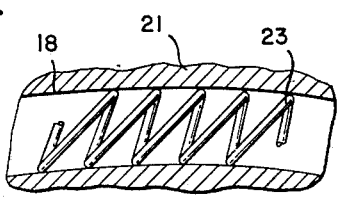
FIGURE 2 is a cross-sectional detail taken along the line 2—2 of FIGURE 1.

At the other end of the seal ring 16, there is a thrust spring 23 which acts to urge the seal ring against the gate. This spring 23 can be formed as shown in FIGURE 2. Thus it can be made of spring wire coiled heliocoidally, and deflected whereby the plane of each convolution extends at an angle of less than 90° with its axis. A spring of this type provides thrust which is uniformly distributed over the entire circumference of the seal ring.

Interposed between the forward end of the resilient seal ring 16 and the adjacent portion of the carrier ring 17, there is a so-called wiper ring 26. This ring is formed of a suitable plastic material, preferably material which is at least as hard or somewhat harder than the material used to make the seal ring 16. Its exterior edge projects a slight distance beyond the corresponding space 27 of the carrier ring.

It is desirable to provide a sediment guard 26 to protect the recess 20 from foreign material in the line fluid. This guard can be a ring formed of suitable plastic material, which is mounted within a groove 29 formed in the carrier ring 17, and loosely projects into a groove 31 formed in the mounting ring 21.

Means are provided for forming a seal between the outer periphery of the seal ring 16 and the adjacent peripheral surface 18 of the mounting ring 21. Thus the seal ring is provided with a groove 33, serving to accommodate the resilient seal ring 34 of the O-ring type.

As shown in FIGURE 1 the sealing means is duplicated upon both sides of the gate 11. The movement of the gate toward one side or the other, under the influence of line pressure, is limited by engagement with the annular surfaces 36 on the mounting rings 21. Within the limits of lateral movement of the gate, the resilient seal ring 16 maintains sealing contact with the surfaces of the gate, and contact is also maintained by the scraper rings 26. The assembly formed by the rings 16 and 17 is substantially free floating, and is free to accommodate itself to maintain good sealing contact with the gate, irrespective of some misalignment or mechanical inaccuracies. The diameter is slightly greater than the mean diameter of the area of contact between the seal ring 16 and the gate, whereby pressure on the upstream side of the valve acts upon the sealing assembly, tending to urge it toward the gate. In the event fluid pressure becomes trapped in the body cavity 13, it acts upon both the sealing assemblies, tending to move them out of sealing contact with the gate, thus relieving the trapped pressure. In other words, the valve is self-relieving with respect to trapped body pressure.

The peripheral surface engaged by the seal rings 22 is the same diameter as the peripheral surface 18 of the mounting ring 21. Therefore, fluid pressure does not tend to move the mounting rings, and these rings remain in the positions shown for all operating conditions.

Figure 3:
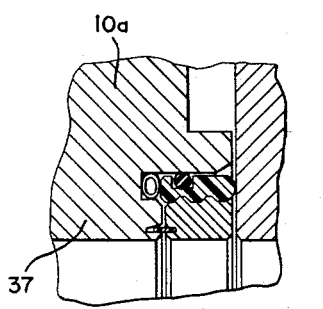
FIGURE 3 is a detail illustrating another embodiment of the invention.

As shown in FIGURE 3, the mounting rings 21 may in some instances be omitted. In this instance the valve body 10a is provided with an annular portion 37, which is recessed to accommodate the sealing assembly.

Figure 4:
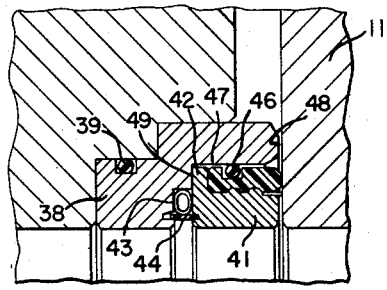
FIGURE 4 is a detail in section illustrating another embodiment of the invention.

As shown in FIGURE 4, the sealing assembly may be provided with a fixed abutment to limit its movement. In this instance the mounting ring 38 corresponds to the ring 21 of FIGURE 1, and it is sealed with respect to the body by the resilient seal ring 39 of the O-ring type. The resilient seal ring 39 is fixed to the carrier ring 41 in the same manner as in FIGURE 1, but the carrier ring is shown provided with a flange 42, which underlies one end of the resilient seal. The coiled thrust spring 43 is located about the sediment guard 44, and acts directly upon the adjacent end of the carrier ring. The seal ring 46 of the O-ring type corresponds to seal ring 34 of FIGURE 1, and contacts the cylindrical peripheral surface 47 of the mounting ring 38. Assuming that the gate 11 is moved toward the right by fluid pressure, to engage the annular surface 48 of the mounting ring, then the flange 42 bottoms upon the shoulder 49, thus providing forces to compress the resilient seal ring which are in excess of forces which can be exerted by the compression spring 43.

Figure 5:
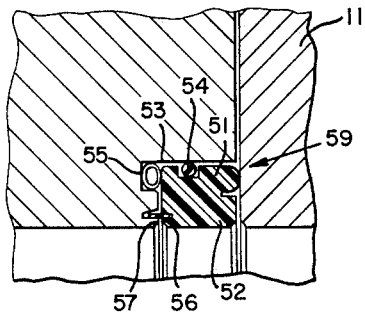
FIGURE 5 is a detail in section illustrating a further embodiment of the invention.

In the embodiment of FIGURE 5 the sealing assembly consists of integral outer and inner parts. Thus the portion 59 corresponds to the resilient seal ring 16, and the inner portion 52, corresponds to the carrier ring 17. However, both parts are formed integral from one piece of material, such as nylon. The part 51 is likewise sealed with respect to the peripheral surface 53, by the seal ring 54 of the O-ring type. Also a coiled spring 55 applies thrust to urge the seal ring toward the gate 11. The inner end face 56 is adapted to bottom upon the annular surface 57 on the body, on the downstream side of the valve.

Figure 6:
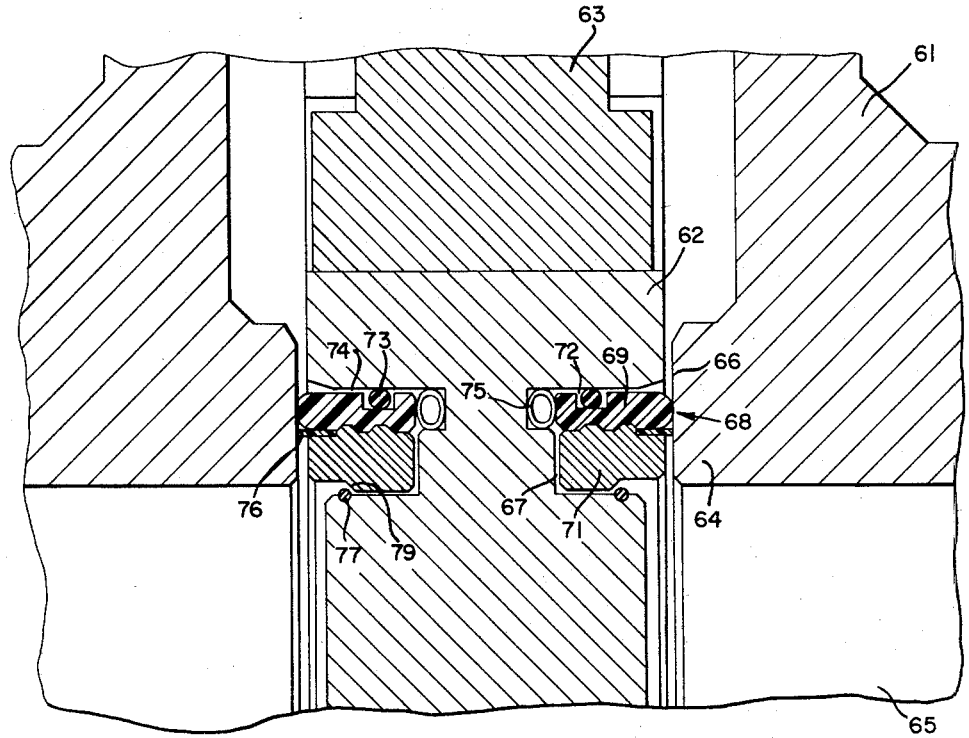
FIGURE 6 is a side elevational view in section illustrating another embodiment in which the sealing means is carried by the movable valve part.

FIGURE 6 illustrates my invention incorporated in the movable gate part of a valve. In this instance the valve body 61 is provided with a movable valve gate 62, attached to the operating stem 63. The annular portions 64 of the valve body, which surround the flow passages 65, are provided with the valve working surfaces 66. The sides of the valve gate are provided with the annular recesses 67, which accommodate the sealing assemblies 68. Each sealing assembly consists of an outer resilient seal ring 69, and an inner carrier ring 71. These rings are substantially the same as the rings 16 and 17 of FIGURE 1. The outer periphery of each ring 69 is provided with a groove 72, to accommodate the seal ring 73 of the O-ring type. Seal ring 73 contacts and seals with respect to the peripheral surface 74. Each seal ring 69 is urged against the corresponding valve working surface 66 by a coiled thrust spring 75. A scraper ring 76 is mounted upon each carrier ring, and corresponds to the scraper rings 26 of FIGURE 1. Each assembly is retained withing the gate by a spring snap-in ring 77. This ring is adapted to engage an annular shoulder 79, on the carrier ring 71.

It will be evident that the sealing arrangement shown in FIGURE 6 operates in substantially the same manner as the sealing arrangement described with reference to FIGURE 1. The sealing assemblies are free floating and are capable of accommodating a substantial amount of movement of the gate between the surfaces 66, and also to accommodate for inaccuracies in manufacture.

I claim:

1. In a valve construction a body part having openings forming flow passages, a valve part disposed within the body part and movable between open and closed positions relative to said openings, and fluid seal means carried by one of said parts and in sealing contact with the other part to form a seal about at least one of said openings for closed position of the valve, said fluid seal means including a seal ring of resilient material, said one part having an annular recess to accommodate said seal ring, the outer periphery of said recess being defined by a cylindrical surface and said seal ring being movably fitted within said recess, means including another resilient seal ring forming a seal between the outer periphery of said first named ring and said surface, spring means acting between said one part and the seal ring to urge the seal ring toward said other part, and a carrier ring fixed to the inner periphery of said first ring and movable therewith, the carrier ring being of substantial radial thickness and having an end face adjacent said other part.

2. A valve construction as in claim 1 in which the carrier ring is a metal part fixed to the inner periphery of said first-named seal ring, said carrier ring and said seal ring being attached by a rib on one ring which interfits a groove in the other of said rings.

3. A valve construction as in claim 1 in which the said first named seal ring has a groove in its outer periphery and in which the second named seal ring is a resilient O-ring disposed in said groove.

4. A valve construction as in claim 1 together with a wiper ring interposed between said first named seal ring and said carrier ring.

5. A valve construction, a body part having openings forming flow passages, a valve part disposed within the body part and movable between open and closed positions relative to said openings, and fluid seal means carried by one of said parts and in sealing contact with the other part to form a seal about at least one of said openings for closed position of the valve, said fluid seal means including a seal ring of resilient material, a carrier ring of substantial radial thickness fixed at its outer periphery to the inner periphery of said seal ring, said one part having an annular recess to accommodate said seal ring and said carrier ring, with one end of said resilient ring in sealing contact with the adjacent valve part, said carrier ring having an end face in proximity with the adjacent valve part and extending inwardly of the seal ring, a groove formed in the outer periphery of said seal ring, a seal ring of the O-ring type disposed within said groove and having sealing contact with a peripheral surface of said one part which defines said recess, and spring means carried by said one body part and acting upon said seal ring to urge the same into sealing engagement with said valve part.

6. A valve construction as in claim 5 in which the carrier ring is formed of metal having its outer periphery fixed to the inner periphery of the seal ring.

7. A valve construction as in claim 5 together with a wiper ring interposed between the seal ring and the carrier ring and adapted to have one edge of the same in contact with said other part.

8. A valve as in claim 5 together with an annular sediment guard interposed between one end of the carrier ring and the body to protect said recess against line fluid sediment.

References Cited in the file of this patent

UNITED STATES PATENTS

| | | |
|---|---|---|
| 2,868,497 | Graham | Jan. 13, 1959 |
| 2,889,134 | Bryant | June 2, 1959 |
| 2,950,897 | Bryant | Aug. 30, 1960 |
| 3,053,543 | Kallin | Sept. 11, 1962 |

FOREIGN PATENTS

| | | |
|---|---|---|
| 876,312 | Great Britain | Aug. 30, 1961 |